United States Patent [19]

Farnos et al.

[11] Patent Number: 5,552,129
[45] Date of Patent: Sep. 3, 1996

[54] CATALYTIC SYSTEM FOR THE REDUCTION OF NITROGEN OXIDES

[75] Inventors: Maria D. Farnos, Wilmington, Del.; John P. McWilliams, Woodbury, N.J.

[73] Assignee: Mobil Oil Corporation, Fairfax, Va.

[21] Appl. No.: 271,686

[22] Filed: Jul. 7, 1994

[51] Int. Cl.[6] ............................................. B01J 8/00
[52] U.S. Cl. ............................................... 423/239.2
[58] Field of Search ........................... 423/239.2; 502/66, 502/68, 71, 85

[56] References Cited

U.S. PATENT DOCUMENTS

| | | | |
|---|---|---|---|
| 4,091,007 | 5/1978 | Dwyer et al. | 260/448 |
| 4,157,375 | 6/1979 | Brown et al. | 423/239 |
| 4,235,753 | 11/1980 | Brown et al. | 252/455 Z |
| 4,522,705 | 6/1985 | Chu et al. | 208/120 |
| 4,778,665 | 10/1988 | Krishnamurthy et al. | 423/239 |
| 4,800,187 | 1/1989 | Lachman et al. | 502/64 |
| 4,867,954 | 9/1989 | Staniulis et al. | 423/239 |
| 4,952,385 | 8/1990 | Nair et al. | 423/326 |
| 4,961,917 | 10/1990 | Byrne | 423/239 |
| 5,024,981 | 6/1991 | Speronello et al. | 502/67 |
| 5,173,278 | 12/1992 | Marler et al. | 423/239 |
| 5,248,643 | 9/1993 | Patil et al. | 502/67 |
| 5,254,322 | 10/1993 | Bhore et al. | 423/239.2 |
| 5,271,913 | 12/1993 | Iida et al. | 423/213.2 |
| 5,310,714 | 5/1994 | Grasselli et al. | 502/64 |

*Primary Examiner*—Michael Lewis
*Assistant Examiner*—Thomas G. Dunn, Jr.
*Attorney, Agent, or Firm*—Ronald A. Bleeker; Malcolm D. Keen; Gerald L. Harris

[57] ABSTRACT

There is presented a specially prepared catalyst and a process for the treatment of exhaust gas with that catalyst, which is useful for the selective catalytic reduction of $NO_x$ contained in the exhaust gas. An embodiment of the process of this invention comprises a catalytic stage to selectively catalytically reduce $NO_x$ over a catalyst composition comprising a metal and an in-situ crystallized zeolite, ZSM-5. The catalyst of this invention may be formed into a desired shape, e.g., by extrusion, and finished in a humidified atmosphere after forming.

30 Claims, No Drawings

CATALYTIC SYSTEM FOR THE REDUCTION OF NITROGEN OXIDES

FIELD OF THE INVENTION

This invention is concerned with the abatement of nitrogen oxides and, optionally, other undesirable compounds, in industrial and engine exhaust gases. In particular, it is concerned with a catalytic method for efficiently eliminating these undesirable compounds before discharge to the atmosphere. It is more particularly concerned with the preparation and use of a specially prepared catalyst comprising an in-situ crystallized zeolite which was prepared from an aggregate containing at least one metal oxide.

BACKGROUND OF THE INVENTION

Although several nitrogen oxides are known which are relatively stable at ambient conditions, it is generally recognized that two of these, viz. nitric oxide (NO) and nitrogen dioxide ($NO_2$), are the principal contributors to smog and other undesirable environmental effects when they are discharged into the atmosphere. These effects will not be discussed further here since they are well recognized and have led various governmental authorities to restrict industrial emissions in an attempt to limit the level of the oxides in the atmosphere. Nitric oxide and nitrogen dioxide, under appropriate conditions, are interconvertible according to the equation.

$$2NO + O_2 \rightleftharpoons 2NO_2$$

For purposes of the present invention, $NO_x$ will be used herein to represent nitric oxide, nitrogen dioxide, and nitrous oxide, as well as mixtures containing these gases.

Formation of man-made nitrogen oxides from the elements occurs in the high temperature zones of combustion processes. The internal combustion engine, and coal or gas-fired or oil-fired furnaces, boilers and incinerators, all contribute to $NO_x$ emissions. In general, fuel-rich combustion mixtures produce exhaust gases with lower contents of $NO_x$ than do lean mixtures. Although the concentrations of $NO_x$ in the exhaust gases produced by combustion usually are low, the aggregate amount discharged in industrial and/or highly populated areas tends to cause problems. Other industrial sources of $NO_x$ also exist. These are associated with the manufacture of nitric acid, with nitration of organic chemicals, and with other chemical operations such as the reprocessing of spent nuclear fuel rods by dissolution in nitric acid to recover uranyl nitrate followed by calcination to convert the nitrate to uranium oxide. In these instances the waste gases may contain relatively high levels of $NO_x$, approaching 3%.

The so-called "stable" nitrogen oxides have in common the somewhat peculiar property that although they are thermodynamically unstable with respect to decomposition into elemental oxygen and nitrogen, no simple, economical method has been described for inducing this decomposition. It has been discovered, however, that the addition of a reductant such as ammonia to the exhaust gas, under appropriate reaction conditions, converts $NO_x$ to elemental nitrogen and steam and denitrifies the exhaust gas.

The process of contacting an industrial flue gas with a catalyst in the presence of ammonia at a temperature in the range of about 200°–600° C. to denitrify the flue gas has come to be known as the process for Selective Catalytic Reduction (SCR) of $NO_x$. In order to avoid confusion, any reference made herein to "Selective Catalytic Reduction," or to "SCR," is intended to refer to a process in which a mixture of $NO_x$ and $NH_3$ are induced to react catalytically at elevated temperatures. The term "denitrify" as used herein, means to reduce the amount of one or more noxious nitrogen compounds (such as NO, $NO_x$ and HCN) contained in a waste gas, preferably by conversion to nitrogen gas.

The use of zeolite-based catalysts for the SCR of nitrogen oxides with ammonia is well established. For example, U.S. Pat. No. 4,220,632 to Pence et al. discloses a process for reducing noxious nitrogen oxides from a fossil-fuel-fired power generation plant, or from other industrial plant off-gas streams, to elemental nitrogen and/or innocuous nitrogen oxides employing ammonia as the reductant and, as the catalyst, the hydrogen or sodium form of a zeolite having pore openings of about 3 to 10 Angstroms.

U.S. Pat. No. 5,173,278 to Marler et al. discloses an SCR process where the ammonia needed for the reduction of $NO_x$ is generated, at least in part, by hydrolysis of HCN over a supported transition metal and/or a crystalline zeolite catalyst. The process described in this patent appears to require that HCN be present.

In particular, it is known that the hydrogen form of ZSM-5 (HZSM-5) is well suited for this reaction at temperatures between about 400°–500° C. U.S. Pat. No. 4,778,665 to Krishnamurthy et al. describes an SCR process for pretreating industrial exhaust gases contaminated with $NO_x$ in which the catalyst has a silica to alumina ratio of at least about 20 and a Constraint Index of 1 to 12. The entire contents of this patent are incorporated herein by reference as if fully set forth.

At temperatures below about 400° C., HZSM-5 is significantly less efficient at removing nitrogen oxides from the gas stream.

BRIEF SUMMARY OF THE INVENTION

One embodiment of this invention is a method for treating an exhaust gas comprising $NO_x$ and ammonia, said method comprising directing the exhaust gas along with a source of oxygen over a catalyst under treating conditions effective for the selective catalytic reduction of $NO_x$; said catalyst comprising a metal and a zeolite having the structure of ZSM-5; said catalyst being prepared by in-situ crystallization of an aggregate comprising ZSM-5 seeds, silica, clay, and a metal oxide selected from at least one of the oxides of Groups of the Periodic Table IIIA, IB, IIB, VA, VIA, VIIA, and VIIIA, said metal oxide being present in the aggregate in an amount sufficient to produce a metal loading on the in-situ formed zeolite of between about 0.01 and about 5 wt. %; said catalyst optionally having been finished in a humidified atmosphere.

Another embodiment of this invention is a method for treating an exhaust gas comprising $NO_x$ and ammonia, said method comprising directing the exhaust gas along with a source of oxygen over a catalyst composition under treating conditions effective for the selective catalytic reduction of $NO_x$; said catalyst composition comprising a metal and an in-situ crystallized zeolite having the structure of ZSM-5; said catalyst composition having been prepared by the steps of:

(a) combining ZSM-5 seeds, silica, clay, and a metal oxide selected from at least one of the oxides of Groups of the Periodic Table IIIA, IB, IIB, VA, VIA, VIIA, and VIIIA into an aggregate;

(b) calcining the aggregate of step (a) at a temperature of at least about 1000° C.;

(c) crystallizing the zeolite by heating the aggregate of step (b) to a temperature greater than about 275° F. in the presence of an alkali metal hydroxide and, optionally, at least one organic directing agent;

(d) recovering the aggregate of step (c); and (e) finishing the recovered aggregate of step (d) in a humidified atmosphere.

Yet another embodiment of this invention is a method for preparing a catalyst useful in the selective catalytic reduction of $NO_x$, said method comprising the steps of: (a) combining ZSM-5 seeds, silica, clay, and a metal oxide selected from at least one of the oxides of Groups of the Periodic Table IIIA, IB, IIB, VA, VIA, VIIA, and VIIIA into an aggregate; (b) calcining the aggregate of step (a) at a temperature of at least about 1000° C.; (c) crystallizing the zeolite by heating the aggregate of step (b) to a temperature greater than about 275° F. in the presence of caustic and, optionally, at least one organic directing agent; (d) recovering the aggregate of step (c); and (e) finishing the recovered aggregate of step (d) in a humidified atmosphere, and the catalyst prepared by the above method.

DETAILED DESCRIPTION

The term "exhaust gas" as used herein means any waste gas which is formed in an industrial process or operation and which is normally disposed of by discharge to the atmosphere, with or without additional treatment. "Exhaust gas" also includes the gas produced by internal combustion engines. The composition of such a gas varies and depends on the particular process or operation which leads to its formation. When formed in the combustion of fossil fuels, it will generally comprise nitrogen, steam and carbon dioxide in addition to low levels, such as up to about 1000 ppm, of nitric oxide plus nitrogen dioxide. Sulfur-containing fuels will typically produce an exhaust gas that contains one or more sulfur oxides, such as $SO_2$. Rich fuel-air mixtures will generally produce an exhaust gas that contains little if any free oxygen along with some carbon monoxide, hydrocarbons, and hydrogen. Lean fuel-air mixtures, i.e., mixtures in which more air is provided than is stoichiometrically required to completely burn the fuel, will form an exhaust gas that contains gaseous oxygen. The foregoing is a general description given to illustrate the variability in the composition of the exhaust gases from fossil fuel combustion. Other industrial processes such as nitration, uranium recovery, and calcining nitrate salt containing solids produce exhaust gases which can have compositions different from those noted above. They may be substantially devoid of steam, for example, and may contain very high concentrations of nitrogen or other inert gases.

The conversion of $NO_x$ to $N_2$ is believed to proceed generally according to equations (1) and (2).

$$2NO_2 + 4NH_3 + O_2 \rightarrow 3N_2 + 6H_2O \quad (1)$$

$$4NO + 4NH_3 + O_2 > 4N_2 + 6H_2O \quad (2)$$

This invention is effective for treating exhaust gas containing the approximate stoichiometric amount of ammonia. The ammonia may be present in the gas, may be added to the gas, or may be produced by an upstream process. As used herein, the expression "approximate stoichiometric amount of ammonia" is intended to mean about 0.75 to about 1.25 times the molar amount of ammonia indicated in equations (1) and (2) when excess oxygen is present.

According to the method of this invention, any carbon monoxide and hydrocarbons present in the exhaust gas may be oxidized to carbon dioxide and water over the catalyst. Additionally, hydrocarbons may be selectively absorbed/adsorbed on the catalyst.

One embodiment of the invention is a method for treating an exhaust gas comprising $NO_x$, ammonia, and, optionally, at least one of CO and a hydrocarbon and mixtures thereof, said method comprising directing the exhaust gas along with a source of oxygen over a catalyst under conditions effective for the selective catalytic reduction of $NO_x$, said catalyst comprising an in-situ formed zeolite which includes at least one metal oxide in the aggregate used to prepare the zeolite, said catalyst optionally having been finished in a humidified atmosphere. The in-situ formed zeolite may be prepared from a aggregate comprising about 3–5% zeolite seeds, e.g., ZSM-5 seeds; 23–25% silica, e.g. colloidal silica; 68–70% clay, e.g., kaolin clay; and 0.01–5% metal oxide, e.g., iron oxide.

Each of the principal features of this invention will be more fully described below.

Feeds

This invention is effective to treat industrial and engine exhaust gases to remove $NO_x$, and optionally other undesirable compounds, such as CO and hydrocarbons, if present. These exhaust gases are typically produced in internal combustion engines, and coal or gas-fired or oil-fired furnaces, boilers and incinerators, and by the manufacture of nitric acid, by the nitration of organic chemicals, and by other chemical operations such as the reprocessing of spent nuclear fuel rods by dissolution in nitric acid to recover uranyl nitrate followed by calcination to convert the nitrate to uranium oxide.

Process Conditions

The exhaust gas is typically treated in the catalytic system of this invention at a temperature of about 200° C. to about 1,000° C. or more, e.g. within the range of about 225° C. to about 900° C., e.g. of about 225° C. to about 750° C., e.g. of about 250° C. to about 600° C. and at a gas hourly space velocity, GHSV, (vols. of gas at STP per volume of catalyst per hour) adjusted to provide the desired conversion. The GHSV can be from about 1,000 to about 500,000 $hr^{-1}$, e.g. within the range of about 2,500 to about 250,000 $hr^{-1}$, e.g. of from about 5,000 to about 150,000 $hr^{-1}$, e.g. of from about 10,000 to about 100,000 $hr^{-1}$. The process of this invention is operable at subatmospheric to superatmospheric pressure, e.g. at about 5 to about 500 psia, e.g. at about 10 to about 50 psia, i.e. near or slightly above atmospheric pressure.

The gas mixture directed over the catalyst should contain at least a stoichiometric amount of oxygen as indicated by equations (1) and (2) above. Excess levels of oxygen above the stoichiometric amount are desirable. If sufficient oxygen is not present in the exhaust gas, a source of oxygen, e.g. air, may be added to the exhaust gas, and if sufficient oxygen is present in the exhaust gas, no air need be added to the exhaust gas.

Adequate conversion may be readily achieved with a simple stationary fixed-bed of catalyst. However, other contacting means are also contemplated, such as contacting with a fluid bed, a transport bed, and a monolithic catalyst structure such as a honeycomb.

Suitable mixing may be used before the catalytic stage of this invention to produce a homogeneous gas mixture for reaction in that stage. The mixers may be any suitable arrangement, including, for example, baffles, discs, ceramic discs, static mixers or combinations of these.

Catalyst Composition

The catalyst employed in this invention is prepared by in-situ crystallization of an aggregate, e.g., a preformed clay aggregate. As noted above, the aggregate comprises four components: ZSM-5 seeds, silica, e.g., a colloidal silica such as Ludox™ available from E. I. DuPont de Nemours & Co., clay, and a metal oxide selected from at least one of the oxides of Groups of the Periodic Table IIIA, IB, IIB, VA, VIA, VIIA, and VIIIA. Optionally, the aggregate can also include alumina. Various techniques for preparing a suitable catalyst for such in-situ crystallization are set out below.

U.S. Pat. No. 4,522,705 discloses a ZSM-5 of enhanced hydrothermal stability suitable for cracking hydrocarbons which is prepared by in-situ crystallization of preformed aggregates.

U.S. Pat. No. 4,091,007 discloses a method for the preparation of ZSM-5 prepared by in-situ crystallization of clay aggregates in the presence of tetraalkylammonium ions. The resulting ZSM-5 can be a discrete particle having a crystallinity of greater than 40 percent by preforming the reaction mixture oxides into pellets or extrudates which retain their shape and acquire substantial strength during the calcination process. In addition to the oxides, the reaction mixture contains a source of alkali metal cations and tetraalkylammonium cations, and water. The crystallized product can be handled in subsequent chemical processing, such as ion exchange, without necessitating cumbersome processes such as filtration. Further, these discrete particles can be used directly as catalysts after appropriate processing but without the need of any reformulation or pelletizing since the non-crystalline portion of the discrete particle serves as the porous matrix of the prior art compositions. One variation on the method of this disclosure which is well-suited to use in the present invention substitutes tetraalkylammonium cations with alkylamine, e.g. n-propylamine. Another variation employs zeolite seeds, e.g., high silica zeolite seeds, in preparing the preformed composite particles whereby a highly crystalline product is obtained in the absence of organic compounds ordinarily employed in zeolite in-situ syntheses. Following the preforming operation, the discrete particles are calcined and then contacted with an alkali metal hydroxide or other hydroxide solution to achieve the desired degree of crystallization. The integrity of the composite particles is retained during the crystallization to provide a zeolite composition in particulate form which is attrition resistant and highly stable.

U.S. Pat. No. 4,800,187 discloses a method for crystallizing strongly bound zeolite such as ZSM-5 on the surface of a sintered monolithic ceramic by hydrothermal treatment with an aqueous base solution.

All of the above references disclose methods for preparing zeolites by in-situ crystallization of a clay aggregate which are suited to use in the present invention and are accordingly incorporated herein by reference. In one embodiment, the zeolite is prepared from a clay aggregate which comprises a non-clay added source of silica.

The sources of silica in the reaction mixture may include both a clay and a non-clay source of silica, or a clay alone. Typical non-clay sources of silica that can be employed in the synthesis are Ludox™, an aqueous dispersion of colloidal silica, water glass, sand, silica gel, fused silica, and finely-divided precipitated silicas, such as Hi-Sil, Quso, and Zeosil 100.

The clay component which is treated to form the zeolite-containing catalyst can be selected from the group consisting of kaolin, halloysite, montmorillonite, illite, and dickite, with kaolin preferred.

The preformed aggregate is typically treated for one or more hours at a temperature sufficient to convert the clay into the metakaolin phase, e.g., greater than about 927° C. to about 1000° C.

The aggregate can be in the form of a monolith, e.g., a honeycombed monolith, or in the form of spheroids, cylinders, or other conventional catalyst shapes. Preferably the aggregate is in the form of a structure suitable for high flow applications, e.g., applications wherein the linear gas velocity is at least 3 meters per second. In an alternative embodiment, the zeolite prepared from in-situ crystallization is applied as a wash coat on a suitable support or substrate.

The aggregate may be formed by extrusion, spray drying or other conventional means. If the aggregate is to be formed by extrusion, a suitable extrusion aid, such as hydroxypropyl methyl cellulose, e.g., Dow K75M Methocel™, may be added to the aggregate. If the aggregate is to be formed by spray drying, sufficient water or other liquid may be added to yield a sprayable mixture.

When the catalyst of this invention is deposited on the substrate, it may be done using a wash coat. The wash coat may be prepared, for example, by adding silica sol and water to the catalyst powder, mulling the mixture to form a thixotropic slurry, dipping the monolithic substrate into the slurry, and then drying and calcining the resulting structure. Alternatively, the catalyst may be formed and extruded together with the substrate and thus may become an integral part of the substrate. The catalyst of this invention may also be formed on the surface of the substrate as is described in U.S. Pat. No. 4,800,187, mentioned above.

Useful conditions for crystallizing the preformed aggregate consist of heating the aggregate to a temperature of from about 75° C. to about 205° C. for a period of time of from about one hour to about 60 days. A narrower temperature range is from about 90° C. to about 175° C. with the amount of time at a temperature in such range being from about one hour to about 20 hours.

Potential metals which may be used in the catalyst of this invention include one or more of those metals, such as transition metals, possibly a noble metal, which are able to oxidize other undesirable compounds present in the exhaust gas along with promoting the SCR of $NO_x$. The metal is typically selected from at least one of the metals of Groups of the Periodic Table IIIA (e.g., cerium), IB (e.g., copper), IIB (e.g., zinc), VA (e.g., vanadium), VIA (e.g., chromium, molybdenum, tungsten), VIIA (e.g., manganese), VIIIA (e.g., iron, nickel, cobalt, rhodium, palladium, platinum), and combinations thereof. An example of a subset of these metals is one or more of the noble metals, platinum, palladium and combinations of these, along with iron and cerium. The above described metals may be used individually and in combination with each other. The term "metal" as used herein is intended to include the elemental metal as well as metal oxides, metal sulfides, and other metal containing compounds.

Metal oxides useful in this invention include at least one of the copper oxides, including copper peroxide ($Cu_2O_3$), cupric oxide (CuO), and cuprous oxide ($Cu_2O$); zinc oxide (ZnO); the vanadium oxides, including vanadium oxide (VO), vanadium dioxide ($VO_2$), vanadium trioxide ($VO_3$), vanadium tetroxide ($VO_4$), vanadium pentoxide ($V_2O_5$); the chromium oxides, including chromium dioxide ($CrO_2$), chromium trioxide ($CrO_3$), chromic oxide ($Cr_2O_3$), chromous oxide (CrO); the manganese oxides, including manganous oxide (MnO), manganic manganous oxide ($Mn_3O_4$), manganese trioxide ($MnO_3$), manganese dioxide ($MnO_2$), manganese heptoxide ($Mn_2O_7$); the cobalt oxides, including cobaltous oxide (CoO), cobaltic oxide ($Co_2O_3$), cobalto cobaltic oxide ($Co_3O_4$); the iron oxides, including ferrous oxide (FeO), ferric oxide ($Fe_2O_3$), ferriferrous oxide ($Fe_3O_4$); the nickel oxides, including nickelous oxide (NiO), nickelic oxide ($Ni_2O_3$), nickelous nickelic oxide ($Ni_3O_4$), nickel peroxide ($NiO_2$), nickel super oxide ($NiO_4$); the palladium oxides, including palladium monoxide (PdO), palladium dioxide ($PdO_2$); the platinum oxides, including platinous oxide (PtO), platinum dioxide ($PtO_2$); the molybdenum oxides, including molybdenum dioxide ($MoO_2$), molybdenum sesquioxide ($Mo_2O_3$), molybdenum trioxide ($MoO_3$); the tungsten oxides, including tungsten dioxide ($WO_2$), tungsten trioxide ($WO_3$), tungsten pentoxide ($W_2O_5$), the cerium oxides, including cerium dioxide ($CeO_2$), cerous oxide ($Ce_2O_3$), and combinations thereof. The solid, water insoluble metal oxides are appropriate for use in the method of this invention.

The desired metal loading based upon the zeolite component of the in-situ formed zeolite of this invention is about 0.01 to about 5 wt. %, e.g. within this range of at least about 0.4 wt. %, e.g., at least about 0.6 wt. %, e.g., at least about 1 wt. %, e.g., at least about 1.5 wt. %, e.g., about 2 wt. %, elemental metal based upon the zeolite.

Alkali or alkaline earth metals may also be present in the catalyst or may be added to the catalyst. Such metals include Na, K, Rb, Cs, Mg, Ca, and Ba.

Original ions, e.g., alkali or alkaline earth metal, of the as-synthesized zeolite and any found in the zeolite/support material can be replaced in accordance with techniques well known in the art, at least in part, by ion-exchange with other ions. For the present catalyst composition, potential replacing ions include hydrogen ions and hydrogen precursor, e.g., ammonium ions. Typical ion-exchange techniques would be to contact the synthetic zeolite or zeolite/support material with a solution containing a salt of the desired replacing ion or ions. Examples of such salts include the halides, e.g., chlorides, nitrates and sulfates. Representative ion-exchange techniques are disclosed in a wide variety of patents including U.S. Pat. Nos. 3,140,249; 3,140,251; and 3,140,253, incorporated by reference herein.

It is to be understood that the identification of the molecular sieves, e.g., zeolites, may be resolved on the basis of their respective X-ray diffraction patterns. The present invention contemplates utilization of such molecular sieves wherein the mole ratio of silica-to-metal oxide is essentially unbounded. The molecular sieves are not limited to specific silica:metal oxide mole ratios and, yet, having the same crystal structure as the disclosed materials, may be useful or even preferred in some applications. It is the crystal structure, as identified by the X-ray diffraction "fingerprint," which establishes the identity of the specific molecular sieve, e.g., zeolite, material.

After the in-situ formed zeolite of this invention has been formed into any desired shape and then crystallized, the metal containing zeolite may be finished by treatment in a humidified atmosphere. This "finish" treatment may include calcination or thermal treatment in air, or in an inert gas, at temperatures ranging from about 260° C. to about 925° C. for periods of time ranging from about 1 to about 48 hours or more, e.g., at about 538° C. for about 4 to about 6 hours. While subatmospheric or superatmospheric pressure can be employed for the thermal treatment, atmospheric pressure is useful simply for reasons of convenience.

Also included in this "finish" treatment is treating the catalyst with gas streams containing steam. Catalysts of improved selectivity and other beneficial properties, such as improved hydrothermal stability, can be obtained by subjecting the metal containing in-situ formed zeolite to at least one treatment with streams containing steam (hydrothermally treating the catalysts) at elevated temperatures ranging from about 260° C. to about 900° C., e.g., from about 400° C. to about 850° C., e.g., from about 500° C. to about 700° C. The hydrothermal treatment may be accomplished in an atmosphere containing at least 20 ppm, 0.5%, 5%, 10%, 20%, and even up to about 99% steam in air or some other suitable gas stream such as nitrogen or some other gas which is essentially inert to the zeolite. Optionally, more than one hydrothermal treatment may be used, e.g., two, three, or more hydrothermal treatments at different temperatures, e.g., increasing temperatures, may be used. Typical steaming conditions are described in U.S. Pat. Nos. 4,429,176; 4,522,929; 4,594,146; and 4,663,492; each incorporated by reference herein. The calcination and hydrothermal treatments of the catalysts may be combined into one treatment step and conducted simultaneously.

As noted above, the catalytic reduction of nitrogen oxides is substantially effected by the use of the present process. By substantially effected is meant a conversion of greater than about 40, 80, 85, 90, 95, or even 99% or more of the nitrogen oxides and the ammonia in the exhaust gas to innocuous compounds, such as nitrogen, through the use of this process. This is also referred to herein as conversion of a substantial portion of the $NO_x$ and ammonia in the exhaust gas to innocuous compounds.

The catalysts of this invention will now be illustrated by examples. The examples are for illustrative purposes only and are not to be construed as limiting the scope of the invention, which scope is defined by this entire specification including the appended claims.

EXAMPLE 1

A component of the in-situ grown ZSM-5 clay aggregate catalyst precursor was prepared by mixing 140 grams of calcined ZSM-5 seeds with 1860 grams of kaolin clay (Kaopaque 10S, a Georgia kaolin clay, Dry Branch Chemical Co., Dry Branch, Ga.). The mixed components will be referred to herein as Component A.

EXAMPLE 2

An in-situ grown ZSM-5 clay aggregate catalyst precursor was prepared by mixing 75.9 grams of Component A from Example 1 with 7.6 grams of Dow Chemical Co. K75M Methocel™ in a muller. To this dry blend, 60.3 grams of E. I. DuPont de Nemours & Co. Ludox™ AS-40 colloidal silica were added while mulling. The mixture was then extruded into 1/16 inch cylindrical extrudates. The extrudates were dried overnight at 120° C. and then calcined at 1010° C. for 3 hours to produce an in-situ grown ZSM-5 catalyst precursor, Precursor A.

EXAMPLE 3

An iron containing in-situ grown ZSM-5 clay aggregate catalyst precursor was prepared by mixing 75.9 grams of Component A from Example 1 with 7.6 grams of Dow K75M Methocel™ and 3.6 grams of $Fe_2O_3$ in a muller. To this dry blend, 60.3 grams of DuPont Ludox™ AS-40 colloidal silica were added while mulling. The mixture was then extruded into $\frac{1}{16}$ inch cylindrical extrudates. The extrudates were dried overnight at 120° C. and then calcined at 1010° C. for 3 hours to produce an in-situ grown ZSM-5 catalyst precursor, Precursor B.

EXAMPLE 4

An in-situ grown ZSM-5 catalyst was prepared by the following method: 100 grams of Precursor A from Example 2 were placed in the bottom of a 1 liter autoclave with 384 grams of water, 16.1 grams of a 50% NaOH solution, and 5.9 grams of n-propylamine. Crystallization was completed under autogenous pressure at 149° C. for 6 hours with no additional nutrients. After synthesis, the extrudates were cooled to room temperature, washed and dried at 120° C. The extrudates were $NH_4^+$ exchanged three times. A hybrid calcination followed which consisted of three hours in nitrogen at 482° C., with air slowly bled in to minimize the exotherm, then the temperature was raised to 537° C. and held for six hours to produce an in-situ grown ZSM-5 catalyst, Catalyst A (greater than about 30% crystallinity).

EXAMPLE 5

An in-situ grown iron-containing ZSM-5 catalyst that should be effective in the method of this invention may be prepared by the following method: about 100 grams of Precursor B from Example 3 may be placed in the bottom of a 1 liter autoclave with about 384 grams of water, about 16.1 grams of a 50% NaOH solution, and about 5.9 grams of n-propylamine. Crystallization should be possible by treating the mixture under autogenous pressure at about 149° C. for about 6 hours with no additional nutrients. After synthesis, the extrudates may be cooled to room temperature, and then may be washed and may be dried at 120° C. The extrudates should be $NH_4^+$ exchanged three times. The ammonium exchanged extrudates may be hybrid calcined, by treating them for about three hours in nitrogen at about 482° C., and then by slowly bleeding air in to minimize the exotherm that may be developed, then raising the temperature to 537° C. and holding the extrudates at that temperature for about six hours.

We claim:

1. A method for treating an exhaust gas comprising $NO_x$ and ammonia, said method comprising directing the exhaust gas along with a source of oxygen over a catalyst under treating conditions effective for the selective catalytic reduction of $NO_x$; said catalyst comprising a metal and a zeolite having the structure of ZSM-5; said process further comprising preparing said catalyst by in-situ crystallization of an aggregate comprising ZSM-5 seeds, clay, a non-clay source of silica, and a metal oxide selected from at least one of the oxides of Groups of the Periodic Table IIIA, IB, IIB, VA, VIA, VIIA, and VIIIA, said metal oxide being present in the aggregate in an amount sufficient to produce a metal loading on the in-situ formed zeolite of between about 0.01 and about 5 wt. %, the aggregate having been calcined at a temperature greater than about 1000° C. prior to crystallization of the zeolite, the catalyst having been finished in a humidified atmosphere under conditions effective to improve the hydrothermal stability of the catalyst, the finish treatment being conducted after the zeolite has been crystallized.

2. The method of claim 1 wherein the clay is selected from the group consisting of kaolin, halloysite, montmorillonite, illite, dickite, and combinations thereof.

3. The method of claim 1 wherein said aggregate comprises kaolin.

4. The method of claim 1 wherein said aggregate is calcined at a temperature sufficient to convert the clay to the metakaolin phase prior to the crystallization of the catalyst.

5. The method according to claim 1 wherein the metal loading of the catalyst is at least about 1.5 wt. % with reference to the zeolite.

6. The method according to claim 5 wherein the metal loading of the catalyst is less than about 3 wt. % with reference to the zeolite.

7. The method according to claim 1 wherein the treating conditions comprise a temperature of about 200° C. to about 1,000° C., a pressure of about 5 to about 500 psia, and a gas hourly space velocity (GHSV) of about 1,000 to about 500,000 $hr^{-1}$.

8. The method according to claim 1 wherein the source of oxygen comprises air.

9. The method according to claim 1 wherein the clay comprises kaolin clay, the metal oxide comprises iron oxide, the aggregate is calcined at a temperature sufficient to convert the clay to the metakaolin phase prior to crystallizing the catalyst, and the crystallized catalyst is finished in a humidified atmosphere.

10. The method according to claim 9 wherein the catalyst is crystallized in the presence of an organic directing agent, said organic directing agent comprising n-propylamine.

11. The method according to claim 1 wherein the metal oxide is selected from at least one of the solid, water insoluble oxides of copper, zinc, vanadium, chromium, manganese, cobalt, iron, nickel, rhodium, palladium, platinum, molybdenum, tungsten, cerium and mixtures thereof.

12. The method according to claim 1 wherein the metal oxide comprises iron oxide.

13. The method according to claim 1 wherein the in-situ crystallized catalyst is finished in a humidified atmosphere which comprises about 20 ppm to about 99% steam at about 260° C. to about 900° C.

14. The method according to claim 1, wherein the catalyst preparation comprises dry blending a mixture of the ZSM-5 seeds and clay with an extrusion aid, the metal oxide, and the non-clay source of silica to produce the aggregate, extruding the aggregate to produce catalyst particles, drying the extruded catalyst particles, calcining the dried catalyst particles, contacting the calcined catalyst particles with an aqueous caustic solution and an organic directing agent, under conditions effective to crystallize the zeolite.

15. The method of claim 14 wherein said organic directing agent comprises tetraalkylammonium halide.

16. The method of claim 14 wherein said organic directing agent comprises tetrapropylammonium bromide.

17. The method of claim 14 wherein said organic directing agent comprises n-alkylamine.

18. The method of claim 14 wherein said organic directing agent comprises n-propylamine.

19. The method of claim 1, wherein the aggregate comprises 3 to 5 weight percent ZSM-5 seeds, 23 to 25 weight percent colloidal silica, 68 to 70 weight percent kaolin clay and 0.01 to 5 weight percent metal oxide.

20. A method for treating an exhaust gas comprising $NO_x$ and ammonia, said method comprising directing the exhaust gas along with a source of oxygen over a catalyst composition under treating conditions effective for the selective catalytic reduction of $NO_x$; said catalyst composition comprising a metal and an in-situ crystallized zeolite having the structure of ZSM-5; said process further comprising preparing said catalyst by:

(a) combining ZSM-5 seeds, silica, clay, and a metal oxide selected from at least one of the oxides of Groups of the Periodic Table IIIA, IB, IIB, VA, VIA, VIIA, and VIIIA into an aggregate;

(b) calcining the aggregate of step (a) at a temperature of at least about 1000° C.;

(c) crystallizing the zeolite by heating the aggregate of step (b) to a temperature greater than about 275° F. in the presence of caustic and, optionally, at least one organic directing agent;

(d) recovering the aggregate of step (c); and (e) finishing the recovered aggregate of step (d) in a humidified atmosphere under conditions effective to improve the hydrothermal stability of the catalyst.

21. The method according to claim 20 wherein the metal oxide is present in an amount sufficient to produce a metal loading based upon the in-situ crystallized zeolite of at least about 1.5 wt. %.

22. The method according to claim 20 wherein the metal oxide is present in an amount sufficient to produce a metal loading based upon the in-situ crystallized zeolite of less than about 3 wt. %.

23. The method according to claim 20 wherein the metal oxide comprises iron oxide.

24. The method of claim 20 wherein said zeolite is crystallized in the presence of an organic directing agent and in the absence of additional nutrients for zeolite crystallization.

25. The method of claim 24 wherein said organic directing agent comprises tetraalkylammonium halide.

26. The method of claim 24 wherein said organic directing agent comprises tetrapropylammonium bromide.

27. The method of claim 24 wherein said organic directing agent comprises n-alkylamine.

28. The method of claim 24 wherein said organic directing agent comprises n-propylamine.

29. The method of claim 20 wherein the clay is selected from the group consisting of kaolin, halloysite, montmorillonite, illite, dickite, and combinations thereof.

30. The method of claim 20 wherein said clay comprises kaolin.

* * * * *